United States Patent
Matsuura et al.

(10) Patent No.: US 6,837,199 B2
(45) Date of Patent: Jan. 4, 2005

(54) VALVE ACTUATING APPARATUS FOR INTERNAL COMBUSTION ENGINE

(75) Inventors: Katsuya Matsuura, Saitama-ken (JP); Hitoshi Takahashi, Saitama-ken (JP); Masaki Takayama, Saitama-ken (JP); Mitsuru Sugimoto, Saitama-ken (JP); Teruyoshi Morita, Saitama-ken (JP); Tomio Kimura, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/637,007

(22) Filed: Aug. 8, 2003

(65) Prior Publication Data

US 2004/0099244 A1 May 27, 2004

(30) Foreign Application Priority Data

Aug. 8, 2002 (JP) ....................................... 2002-231613

(51) Int. Cl.[7] ................................................. F01L 1/34
(52) U.S. Cl. ..................... 123/90.16; 123/316
(58) Field of Search ........................... 123/90.15–90.17, 123/316

(56) References Cited

U.S. PATENT DOCUMENTS

| 6,237,551 | B1 | * | 5/2001 | Macor et al. | 123/90.15 |
| 6,571,765 | B2 | * | 6/2003 | Kuboshima et al. | 123/316 |
| 2003/0213449 | A1 | * | 11/2003 | Bloms et al. | 123/90.15 |
| 2004/0055564 | A1 | * | 3/2004 | Crowell et al. | 123/316 |

* cited by examiner

Primary Examiner—Erick Solis
(74) Attorney, Agent, or Firm—Arent Fox, PLLC.

(57) ABSTRACT

A valve actuating apparatus for an internal combustion engine selectively operating in the normal Otto cycle or the Miller cycle is provided which enables the engine to achieve stable combustion and improved fuel economy during cruising or in a low-load engine operating region. A delayed-closing cam for Miller cycle operation and a normal cam having a cam profile for earlier valve-closing timing of the intake valve than a cam profile of the delayed-closing cam are provided on a camshaft. A cam profile-switching mechanism switches between the delayed-closing cam and the normal cam, for opening and closing the intake valve. An ECU controls the switching mechanism such that when a detected operating condition of the engine indicates starting or idling, the intake valve is operated by the normal cam, and when the detected operating condition indicates cruising, the intake valve is operated by the delayed-closing cam.

4 Claims, 12 Drawing Sheets

| OPERATING REGION | IV1 | IV2 |
|---|---|---|
| A | LOW-SPEED V/T | LOW-SPEED V/T |
| B1 | IDLING V/T | DELAYED -CLOSING V/T |
| B2 | DELAYED -CLOSING V/T | DELAYED -CLOSING V/T |
| C | LOW-SPEED V/T | LOW-SPEED V/T |
| D | HIGH-SPEED V/T | HIGH-SPEED V/T |

OPERATING REGION A
(IDLING REGION)

OPERATING REGION B1
(LOW-LOAD MODE REGION)

OPERATING REGION B2
(MEDIUM-LOAD MODE REGION)

OPERATING REGION C
(LOW-ROTATIONAL SPEED/
HIGH-LOAD REGION)

OPERATING REGION D
(HIGH-ROTATIONAL
SPEED REGION)

A : DELAYED-CLOSING ROCKER ARM
C : IDLING ROCKER ARM
L : LOW-SPEED ROCKER ARM
H : HIGH-SPEED ROCKER ARM

OPERATING REGIONS C, D
(HIGH LOAD/LOW-ROTATIONAL SPEED, HIGH-ROTATIONAL SPEED REGIONS)

A : DELAYED-CLOSING ROCKER ARM
H : HIGH-SPEED ROCKER ARM

OPERATING REGIONS B1, B2
(LOW-LOAD MODE, MEDIUM-LOAD MODE REGIONS)

OPERATING REGION A
(IDLING REGION)

OPERATING REGION A
(IDLING REGION)

OPERATING REGIONS B1, B2
(LOW-LOAD MODE,
MEDIUM-LOAD MODE REGIONS)

OPERATING REGIONS C, D
(HIGH LOAD/LOW-ROTATIONAL SPEED,
HIGH-ROTATIONAL SPEED REGIONS)

A : DELAYED-CLOSING ROCKER ARM
H : HIGH-SPEED ROCKER ARM

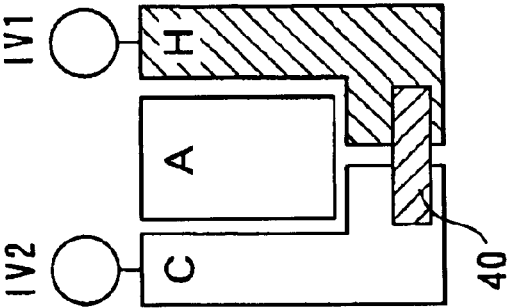
FIG. 12A — OPERATING REGION A (IDLING REGION)
FIG. 12B — OPERATING REGIONS B1, B2 (LOW-LOAD MODE, MEDIUM-LOAD MODE REGIONS)
FIG. 12C — OPERATING REGIONS C, D (HIGH LOAD/LOW-ROTATIONAL SPEED, HIGH-ROTATIONAL SPEED REGIONS)
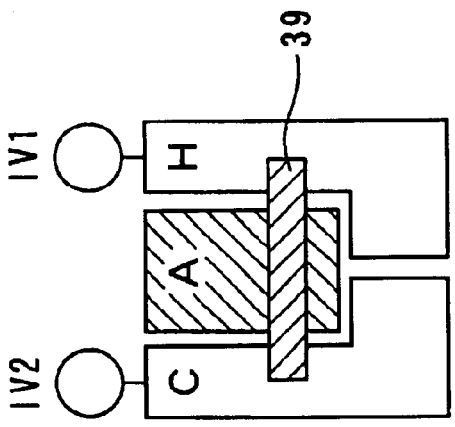
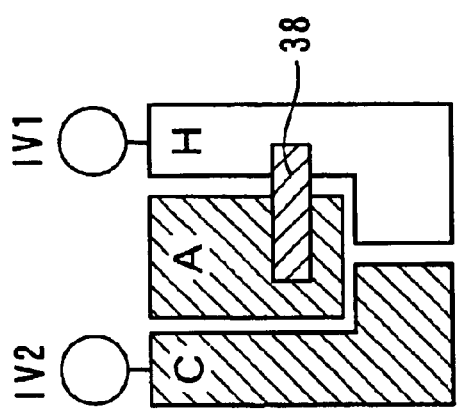
A : DELAYED-CLOSING ROCKER ARM
C : IDLING ROCKER ARM
H : HIGH-SPEED ROCKER ARM

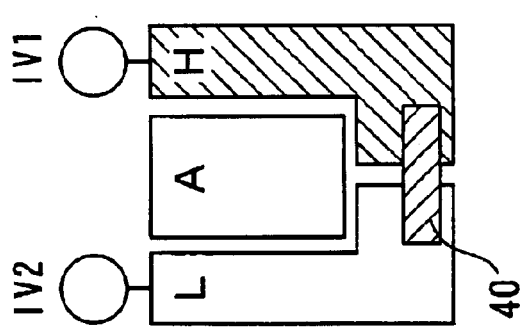
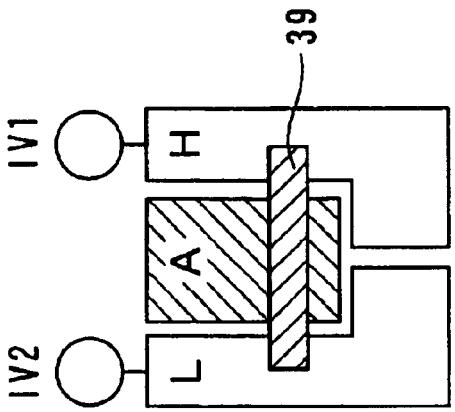
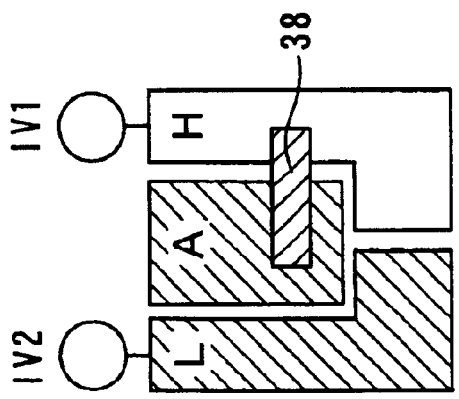

FIG. 14

| NUMBER OF INTAKE VALVES | DELAYED-CLOSING CAM | IDLING CAM | LOW-SPEED CAM | HIGH-SPEED CAM | NOTES |
|---|---|---|---|---|---|
| 1 | ○ | — | — | ○ | THIRD EMBODIMENT |
| 2 | ○ | ○ | — | ○ | SECOND EMBODIMENT |
| 2 | ○ | — | — | ○ | FOURTH EMBODIMENT |
| 2 | ○ | — | ○ | ○ | FIFTH EMBODIMENT |
| 2 | ○ | ○ | ○ | ○ | FIRST EMBODIMENT (VARIATION) |

VALVE ACTUATING APPARATUS FOR INTERNAL COMBUSTION ENGINE

BACKGROUND OF THE INVENTION

1. Field of the Invention

This invention relates to a valve actuating apparatus for an internal combustion engine, which controls opening/closing operations of an intake valve, particularly valve-closing timing of the same.

2. Description of the Prior Art

Conventionally, a valve actuating apparatus of the above-mentioned kind is disclosed e.g. in Japanese Utility Model Publication (Kokoku) No. 56-9045. This valve actuating apparatus comprises a camshaft that rotates in synchronism with rotation of a crankshaft of an internal combustion engine, a pair of cams having different cam profiles, a pivotally movable rocker arm that comes into contact with a selected one of the two cams and is held in contact with an intake valve, a rocker shaft that pivotally movably supports the rocker arm, and a switching mechanism that switches a cam for contact with the rocker arm, between the pair of cams.

The pair of cams are comprised of a normal cam and a delayed-closing cam. The normal cam has a cam profile designed for a maximum power output of the engine in medium-load and high-load operating regions, while the delayed-closing cam has a cam profile designed for delayed valve-closing timing of the intake valve compared with valve-closing timing provided by the normal cam, for operation of the engine in the Miller cycle operation. These cams are integrally formed on the camshaft, for rotation along with the camshaft in synchronism with rotation of the crankshaft. According to the above configuration, the intake valve is opened and closed by a selected one of the cams via the rocker arm in timing corresponding to the profile of the selected cam.

The switching of the cam for contact with the rocker arm between the two cams is performed by the switching mechanism according to the load on the engine. This switching mechanism is comprised of a bracket provided on the rocker shaft, a control ring coaxially provided on the rocker shaft on a side of the rocker arm remote from the bracket, springs disposed, respectively, between the bracket and the rocker arm and between the control ring and the rocker arm, and an actuator connected to the control ring. The actuator actuates the control ring along the axis of the rocker shaft to move the rocker arm along the axis of the rocker shaft against the urging forces of the springs, whereby the cam for contact with the rocker arm is switched between the two cams.

Due to this configuration, in the medium-load and high-load operating regions of the engine, the intake valve is opened and closed by the normal cam for operation of the engine in the normal Otto cycle, while in a low-load operating region, the same is opened and closed by the delayed-closing cam. When the intake valve is opened and closed by the delayed-closing cam, the engine operates in the so-called Miller cycle in which valve-closing timing is delayed, whereby most of a mixture drawn into a cylinder is returned into the intake pipe by the compression stroke of a piston, whereby optimal intake air compression in the low-load operating region can be achieved. This makes it possible to reduce pumping loss, which occurs when the normal cam is used, to thereby improve fuel economy.

However, the above conventional valve actuating apparatus suffers from the following problems: When the engine is in the low-load operating region, fuel economy can be improved during cruising of the vehicle, as described above, but during the starting and idling of the engine, opening and closing of the intake valve by the delayed-closing cam causes degradation of combustion in the cylinder, resulting in unstable combustion. Further, when a delayed-closing cam modified in cam profile for reduced delay in valve-closing timing is used so as to prevent degradation of combustion, pumping loss during cruising or in the low-load operating region of the engine cannot be sufficiently reduced, which reduce the above-mentioned effect of the improvement of fuel economy. In short, during cruising of the vehicle, or in the low-load operating region of the engine, it is difficult to achieve both of stable combustion and improved fuel economy at the same time.

SUMMARY OF THE INVENTION

It is an object of the invention to provide a valve actuating apparatus for an internal combustion engine, which is capable of achieving stable combustion and improved fuel economy at the same time during cruising or in a low-load operating region of the engine, when the engine selectively operates either in the normal Otto cycle and in the Miller cycle.

To attain the above object, the present invention provides a valve actuating apparatus for an internal combustion engine, which actuates an intake valve of the engine for opening and closing thereof, the valve actuating apparatus comprising:

a camshaft that is driven for rotation in synchronism with rotation of the engine;

a delayed-closing cam provided on the camshaft, for operation of the engine in a Miller cycle;

a normal cam provided on the camshaft and having a cam profile for earlier valve-closing timing of the intake valve than a cam profile of the delayed-closing cam;

a switching mechanism that switches the intake cam for opening and closing the intake valve, between the delayed-closing cam and the normal cam;

operating condition-detecting means for detecting an operating condition of the engine; and switching mechanism control means for controlling the switching mechanism such that when the detected operating condition of the engine indicates starting or idling of the engine, the intake valve is opened and closed by the normal cam, and when the detected operating condition of the vehicle is a predetermined operating condition indicating other than the starting and idling of the engine, the intake valve is opened and closed by the delayed-closing cam.

With the arrangement of the valve actuating apparatus according to the present invention, the delayed-closing cam and the normal cam having respective different cam profiles are provided on the camshaft, for opening and closing the intake valve, and the switching mechanism selectively switches the cam for operating the intake cam between the delayed-closing cam and the normal cam. Further, the operation of the switching mechanism is controlled by the switching mechanism control means. When the detected operating condition of the engine indicates starting or idling of the engine, the intake cam is switched to the normal cam. This prevents degradation of combustion which would be caused by the use of the delayed-closing cam under such an engine operating condition, thereby ensuring stable combustion of the engine. On the other hand, when the detected operating condition of the engine is a predetermined operating condition indicating other than starting or idling of the engine, the intake cam is switched to the delayed-closing cam. This makes it possible to reduce pumping loss in the predetermined operating condition of the engine, thereby improving fuel economy. As described above, since the intake cam is switched between the delayed-closing cam and the normal cam according to the operating condition of the engine, it is possible to achieve both stable combustion and improved fuel economy in the low-load engine operating region at the same time.

Preferably, the operating condition-detecting means includes load parameter-detecting means for detecting a load parameter indicative of a load on the engine, and the predetermined operating condition of the engine includes a condition of the load parameter detected by the load parameter-detecting means being smaller than a first predetermined value.

With the arrangement of the preferred embodiment, when the detected load parameter indicative of a load on the engine is smaller than the first predetermined value and at the same time the engine is starting or idling, the intake cam is switched to the normal cam. By setting the first predetermined value to the upper limit value of the low-load operating region, when the engine is in the low-load operating region during starting or idling, it is possible to prevent degradation of combustion which would be caused by the use of the delayed-closing cam during starting or idling of the engine, thereby ensuring stable combustion. On the other hand, when the detected operating condition of the engine is the predetermined low-load operating condition indicating other than the starting and idling of the engine, the intake cam is switched to the delayed-closing cam. This makes it possible to reduce pumping loss when the engine is in the low-load operating region, thereby improving fuel economy.

Preferably, the intake valve comprises at least a first intake valve and a second intake valve, the valve actuating apparatus further comprising an idling cam provided on the camshaft and having a cam profile for making the first intake valve substantially idle, and the switching mechanism control means controls the switching mechanism such that when the load parameter is smaller than a second predetermined value which is smaller than the first predetermined value, the first intake valve is made substantially idle by the idling cam, and the second intake valve is opened and closed by the delayed-closing cam, and when the load parameter is equal to or larger than the second predetermined value and smaller than the first predetermined value, the first intake valve and the second intake valve are opened and closed by the delayed-closing cam.

With the arrangement of this preferred embodiment, the intake valve includes at least a first intake valve and a second intake valve, and the camshaft is further provided with an idling cam. Through the control of the switching mechanism, when the load on the engine detected by the load-detecting means is lower than the first predetermined value, if the same is lower than the second predetermined value, the first intake valve is made substantially idle by the idling cam, and the second intake valve is opened and closed by the delayed-closing cam. Therefore, by setting the first predetermined value to the upper limit value of the low-load operating region as described above, when the engine is in the low-load operating region, it is possible to generate a swirl within the combustion chamber of the engine to thereby suppress degradation of combustion and ensure stable combustion in spite of the use of the delayed-closing cam that delays valve-closing timing. On the other hand, when the load on the engine is equal to or larger than the second predetermined value and at the same time smaller than the first predetermined value, the first and second intake valves are opened and closed by the delayed-closing cam alone. This makes it possible to further reduce pumping loss when the engine is in the low-load operating region, to thereby improve fuel economy. By selectively using the delayed-closing cam, the idling cam, and the normal cam according to a load on the engine as described above, it is possible to further improve stability of combustion and fuel economy.

Preferably, the engine is installed on a vehicle, and the predetermined operating condition of the engine corresponds to cruising of the vehicle.

With the arrangement of the preferred embodiment, since the predetermined operating condition of the engine corresponds to cruising of the vehicle, when the vehicle is cruising, the intake cam is switched to the delayed-closing cam. This makes it possible to reduce pumping loss during cruising of the vehicle, thereby improving fuel economy. By switching the intake cam between the delayed-closing cam and the normal cam according to the operating condition of the vehicle as described above, it is possible to achieve both stable combustion and improved fuel economy in the low-load engine operating region at the same time.

Preferably, the intake valve comprises at least a first intake valve and a second intake valve, the valve actuating apparatus further comprising an idling cam provided on the camshaft and having a cam profile for making the first intake valve substantially idle, and the operating condition-detecting means comprises load parameter-detecting means for detecting a load parameter indicative of a load on the engine, and the switching mechanism control means controlling the switching mechanism such that under the predetermined operating condition of the engine corresponding to the cruising of the vehicle, when the load parameter detected by the load parameter-detecting means is smaller than a predetermined value, the first intake valve is made substantially idle by the idling cam, and the second intake valve is opened and closed by the delayed-closing cam, and when the load parameter is equal to or larger than the predetermined value, the first intake valve and the second intake valve are opened and closed by the delayed-closing cam.

With the arrangement of this preferred embodiment, the intake valve includes at least a first intake valve and the second intake valve, and the camshaft is further provided with an idling cam. Through the control of the switching mechanism, when the vehicle is cruising and at the same time the load parameter detected by the load parameter-detecting means is smaller than the predetermined value, the first intake valve is made substantially idle by the idling cam, and the second intake valve is opened and closed by the delayed-closing cam, while when the detected load parameter is equal to or larger than the predetermined value, the first and second intake valves are opened and closed by the delayed-closing cam. By setting the predetermined value to a value indicative of a boundary between a higher-load part and a lower-load portion of the low-load operating region, when the engine is in the lower-load portion of the low-load operating region, it is possible to generate a swirl within a combustion chamber of the engine to thereby suppress degradation of combustion and ensure stable combustion in spite of the use of the delayed-closing cam for delayed valve-closing timing. On the other hand, when the vehicle is cruising, and the load parameter is equal to or larger than the predetermined value, that is, when the engine is in the higher-load portion of the low-load operating region, the first and second intake valves are opened and closed by the delayed-closing cam alone. This makes it possible to further reduce pumping loss during cruising of the vehicle, thereby improving fuel economy. By selectively using the delayed-closing cam, the idling cam, and the normal cam according to a load on the engine as described above, it is possible to further improve stability of combustion and fuel economy.

Further preferably, the normal cam comprises a low-speed cam having a cam profile that gives a valve lift of the intake valve, which is equal to or smaller than a valve lift given by the cam profile of the delayed-closing cam, and a high-speed cam having a cam profile that gives a valve lift of the intake valve, which is larger than the valve lifts given by the respective cam profiles of the delayed-closing cam and the low-speed cam, the valve actuating apparatus further comprising a first rocker arm in contact with the idling cam and the first intake valve, a second rocker arm in contact with the delayed-closing cam, a third rocker arm in contact with the low-speed cam and the second intake valve, and a fourth rocker arm in contact with the high-speed cam, and the switching mechanism having a first switching device for switching between connection and disconnection of the second rocker arm and the third rocker arm, a second switching device for switching between connection and disconnection of the first rocker arm and the third rocker arm, and a third switching device for switching between connection and disconnection of the first rocker arm, the third rocker arm, and the fourth rocker arm, wherein the first rocker arm is smaller in width along a direction of an axis of the crankshaft than the third rocker arm, and the second rocker arm is disposed between the first rocker arm and the third rocker arm, the fourth rocker arm being disposed on a side of the first rocker arm remote from the second rocker arm.

With the arrangement of this preferred embodiment, the low-speed cam and the high-speed cam are provided on the camshaft as normal cams. Further, the first to fourth rocker arms are held in contact with the idling cam, the delayed-closing cam, the low-speed cam, and the high-speed cam, respectively, and the first and third rocker arms are held in contact with the first and second intake valves, respectively, as well. The switching mechanism has the first to third switching devices, and the intake cam for opening and closing the intake valve can be switched by switching between connection and disconnection of the rocker arms by the associated switching devices.

More specifically, when only the first and third rocker arms are connected by the second switching device, since the valve lift by the low-speed cam is larger than that by the idling cam, the first and second intake valves are both opened and closed by the low-speed cam. That is, the above-described actuation of the intake valve(s) during starting or idling of the engine can be realized. Further, when the first to third rocker arms are connected by the first and second switching devices, the first and second intake valves can be closed in delayed timing by the delayed-closing cam. That is, the actuation of the intake valve(s) under a condition described in one of the above described preferred embodiments in which the vehicle is cruising and the load parameter is equal to or larger than the predetermined value, and actuation of the same under a condition described in another of the above described preferred embodiments in which the load parameter is equal to or larger than the second predetermined value and smaller than the first predetermined value can be realized. Furthermore, when only the second and third rocker arms are connected by the first switching device, the second intake valve is opened and closed by the delayed-closing cam, and the first intake valve is made substantially idle by the idling cam. That is, actuation of the intake valve(s) under the condition in the one of the above described preferred embodiments in which the vehicle is cruising and the load parameter is smaller than the predetermined value, and under the condition in the other of the above described preferred embodiments in which the load parameter is smaller than the second predetermined value can be realized. Moreover, when the first, third, and fourth rocker arms are connected by the third switching device, since the valve lift by the high-speed cam is larger than by any other cam, the first and second intake valves are both opened and closed by the high-speed cam. As a result, the amount of intake air is increased, whereby larger power output of the engine can be obtained. Other combinations of the first to third rocker arms to be selected for connection and disconnection can provide additional varieties of selections from the cams for opening and closing the first intake valve and/or the second intake valve.

Further, the first to fourth rocker arms are arranged in order of the fourth, first, second and third rocker arms. The first rocker arm is smaller in width than the third rocker arm, and hence when the rocker arms are arranged as above, the distance, as viewed along the axis of the camshaft, between the center of the combustion chamber and the end of the fourth rocker arm can be made shorter than in the case where the fourth rocker arm is disposed at a location axially outward of the third rocker arm, which makes it possible to arrange all the rocker arms in a manner well-balanced with respect to the combustion chamber.

The above and other objects, features, and advantages of the invention will become more apparent from the following detailed description taken in conjunction with the accompanying drawings.

BRIEF DESCRIPTION OF THE DRAWINGS

FIGS. 12A to 12C are schematic views showing essential components of a valve actuating apparatus according to a fourth embodiment of the invention FIGS. 13A to 13C are schematic views showing essential components of a valve actuating apparatus according to a fifth embodiment of the invention; and FIG. 14 is a table showing combinations of intake cams for use in the respective embodiments.

DETAILED DESCRIPTION OF THE PREFERRED EMBODIMENTS

Hereafter, the invention will be described in detail with reference to the drawings showing preferred embodiments thereof.

Figure 1:
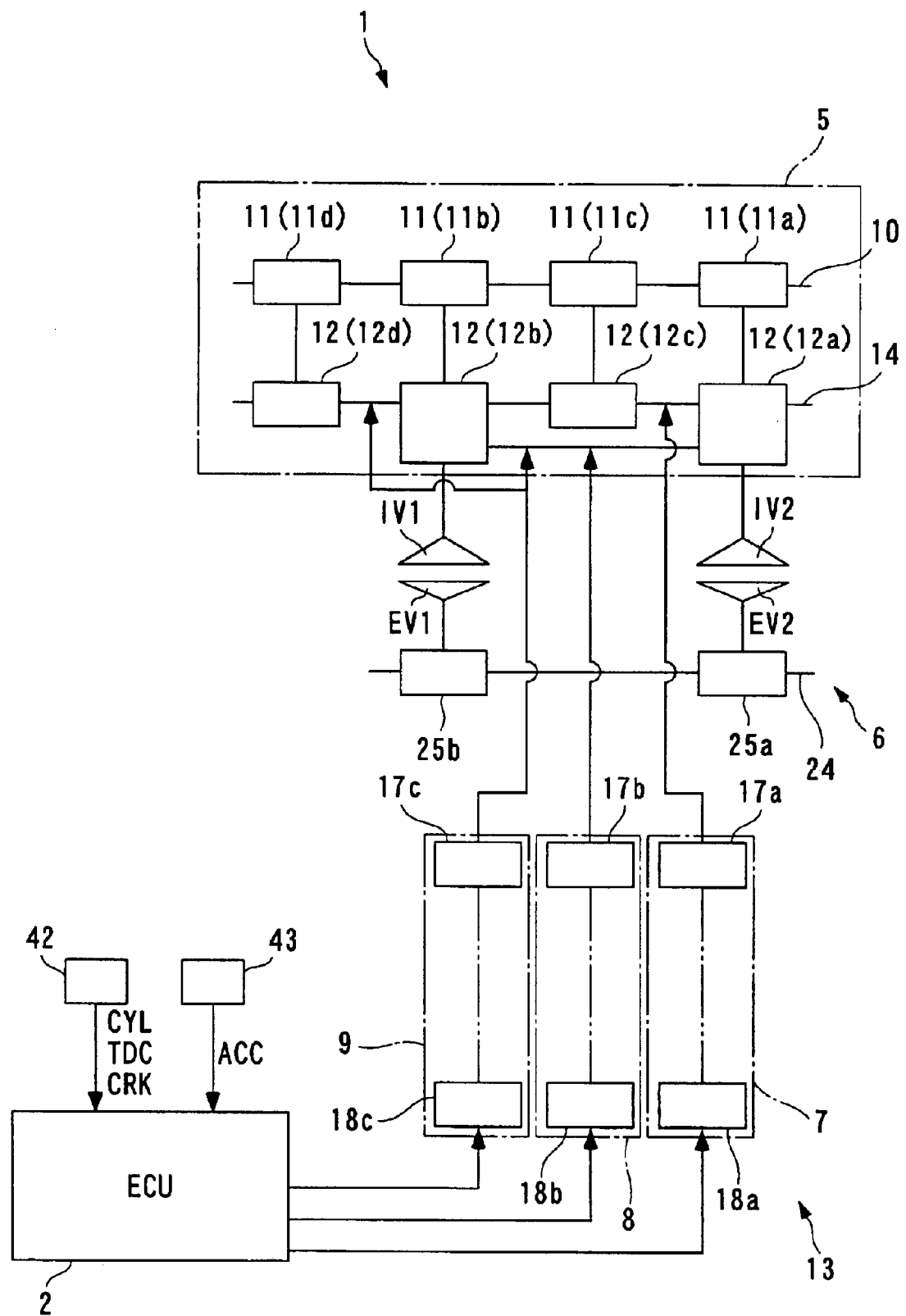
FIG. 1 is a block diagram schematically showing the arrangement of a valve actuating apparatus according to a first embodiment of the invention.
Figure 2:
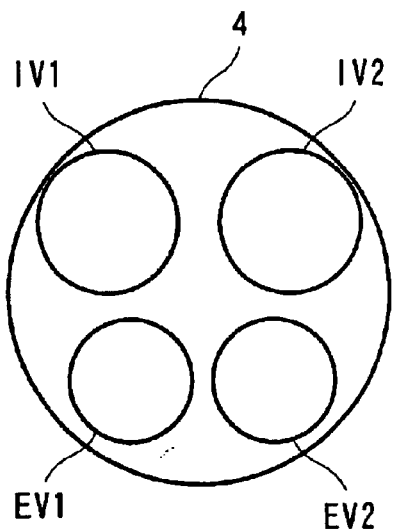
FIG. 2 is a view illustrating a layout of intake valves and exhaust valves.
Figure 3:
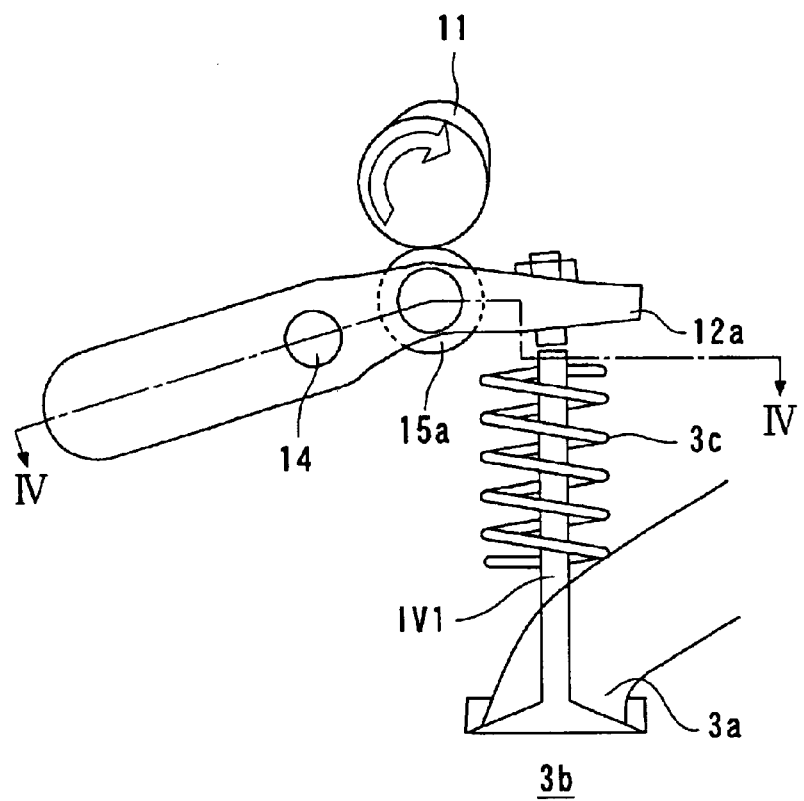
FIG. 3 is a side view of an intake valve and the valve actuating apparatus.

Referring first to FIG. 1, there is schematically shown the arrangement of a valve actuating apparatus 1 for an internal combustion engine, according to a first embodiment of the invention. The internal combustion engine (hereinafter simply referred to as "the engine") 3 is an inline four-cylinder (only one of the cylinders is shown in FIG. 2) DOHC gasoline engine installed on a vehicle, not shown. As shown in FIG. 2, each cylinder 4 is provided with first and second intake valves IV1, IV2 (intake valve) and first and second exhaust valves EV1, EV2. As illustrated in FIG. 3 showing the first intake valve IV1 by way of example, the intake valves IV1, IV2 are arranged such that each of them is movable between a closed position (shown in FIG. 3) for closing an intake port 3a of the engine 3 and an open position (not shown) projected into a combustion changer 3b, for opening the intake port 3a, and urged by a coil spring 3c toward the closed position.

As shown in FIG. 1, the valve actuating apparatus 1 includes a cam-type valve actuating mechanism 5 provided on an intake side for opening and closing the first and second intake valves IV1, IV2, and a cam-type valve actuating mechanism 6 provided on an exhaust side for opening and closing the first and second exhaust valves EV1, EV2, a cam profile-switching mechanism 13 (switching mechanism) for switching between respective cam profiles of intake cams 11, referred to hereinafter, of the cam-type valve actuating mechanism 5, and an ECU 2 (switching mechanism control means) for controlling the operation of the cam profile-switching mechanism 13.

The cam-type valve actuating mechanism 5 on the intake side is comprised of a camshaft 10, the intake cams 11 integrally provided on the camshaft 10, and rocker arms 12 for being driven respectively by the intake cams 11 and pivotally movable for converting rotating motion of the camshaft 10 into reciprocating motions of the intake valves IV1, IV2. The camshaft 10 is connected to a crankshaft, not shown, of the engine 3 via a driven sprocket and a timing chain (neither of which is shown), and driven by the crankshaft, for rotation such that it performs one rotation per two rotations of the crankshaft.

As shown in FIG. 1, the intake cams 11 are comprised of a low-speed cam 11a as a normal cam, an idling cam 11b having a very low cam profile, a delayed-closing cam 11c interposed between the two cams 11a, 11b, and a high-speed cam 11d having a higher cam profile than that of the low-speed cam 11a and disposed as a normal cam on a side of the idling cam 11b remote from the delayed-closing cam 11c. These cams 11a to 11d are integrally formed on the camshaft 10. Among the cams 11a to 11d, the idling cam 11b is smallest in width along the direction of the axis of the camshaft 10, and the high-speed cam 11d is largest in the same. It should be noted that the idling cam 11b may be formed by a cam having a cam profile providing a valve lift of zero.

Figure 4:
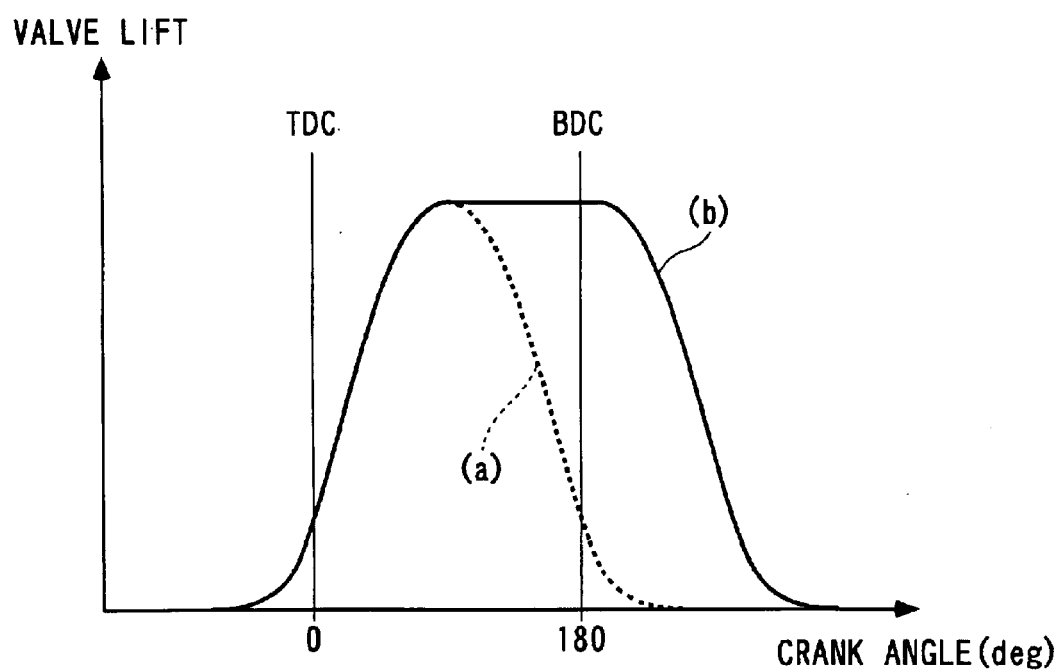
FIG. 4 is a diagram showing a lift curve (a) provided by a low-speed cam and a lift curve (b) by a delayed-closing cam.

As shown in FIG. 4, a lift curve ((b) in FIG. 4) provided by the delayed-closing cam 11c rises in the same fashion as a lift curve ((a) in FIG. 4) provided by the low-speed cam 11a, until the maximum valve lift is reached. However, valve-closing timing by the delayed-closing cam 11c is set to lag behind valve-closing timing by the low-speed cam 11a. More specifically, the valve-closing timing by the low-speed cam 11a is set such that the driving force of the engine 3 is maximized, and hence, valve closing by the low-speed cam 11a is started without delay after the maximum valve lift is reached by the low-speed cam 11a, and terminated slightly after the crank angle of the crankshaft reaches a BDC (bottom dead center) position at the end of an intake stroke of a piston, not shown. On the other hand, valve closing by the delayed-closing cam 11c is started only after the reached maximum valve lift is maintained until shortly after the crank angle passes the BDC position at the end of the intake stroke of the piston. In short, the delayed-closing cam 11c is configured such that the valve-closing timing set thereby becomes later than the timing set by the low-speed cam 11a, as described above, whereby the engine 3 is caused to operate in the so-called Miller cycle.

The rocker arms 12 are comprised of a low-speed rocker arm 12a as a third rocker arm, an idling rocker arm 12b as a first rocker arm, a delayed-closing rocker arm 12c as a second rocker arm, and a high-speed rocker arm 12d as a fourth rocker arm corresponding, respectively, to the low-speed, idling, delayed-closing, and high-speed cams 11a to 11d. The low-speed, idling, and high-speed rocker arms 12a, 12b, 12d each have a central portion thereof pivotally mounted on a rocker shaft 14. The delayed-closing rocker arm 12c is formed to be smaller in length than the other rocker arms 12a, 12b, 12d, and has one end portion thereof pivotally mounted on the rocker shaft 14. The intake cams 11, i.e. the low-speed, idling, delayed-closing, and high-speed cams 11a to 11d are in slidable contact with the rocker arms 12a to 12d, respectively, via respective rollers 15a to 15d. Further, the idling rocker arm 12b and the low-speed rocker arm 12a are in abutment with the upper ends of the first intake valve IV1 and the second intake valve IV2, respectively. The rocker shaft 14 is formed with first to third oil passages 16a to 16c for a cam profile-switching mechanism 13 described below.

The cam profile-switching mechanism 13 is comprised of a first switching device 7 for switching between connection and disconnection of the low-speed and delayed-closing rocker arms 12a, 12c, a second switching device 8 for switching between connection and disconnection of the low-speed and idling rocker arms 12a, 12b, and a third switching device 9 for switching between connection and disconnection of the low-speed, idling, and high-speed rocker arms 12a, 12b, 12d.

The first switching device 7 is comprised of a first switching valve 17a for hydraulically switching between connection and disconnection of the low-speed and delayed-closing rocker arms 12a, 12c, and a first oil pressure-switching mechanism 18a for switching between supply and cut-off of oil pressure to the first switching valve 17a.

Figure 5:
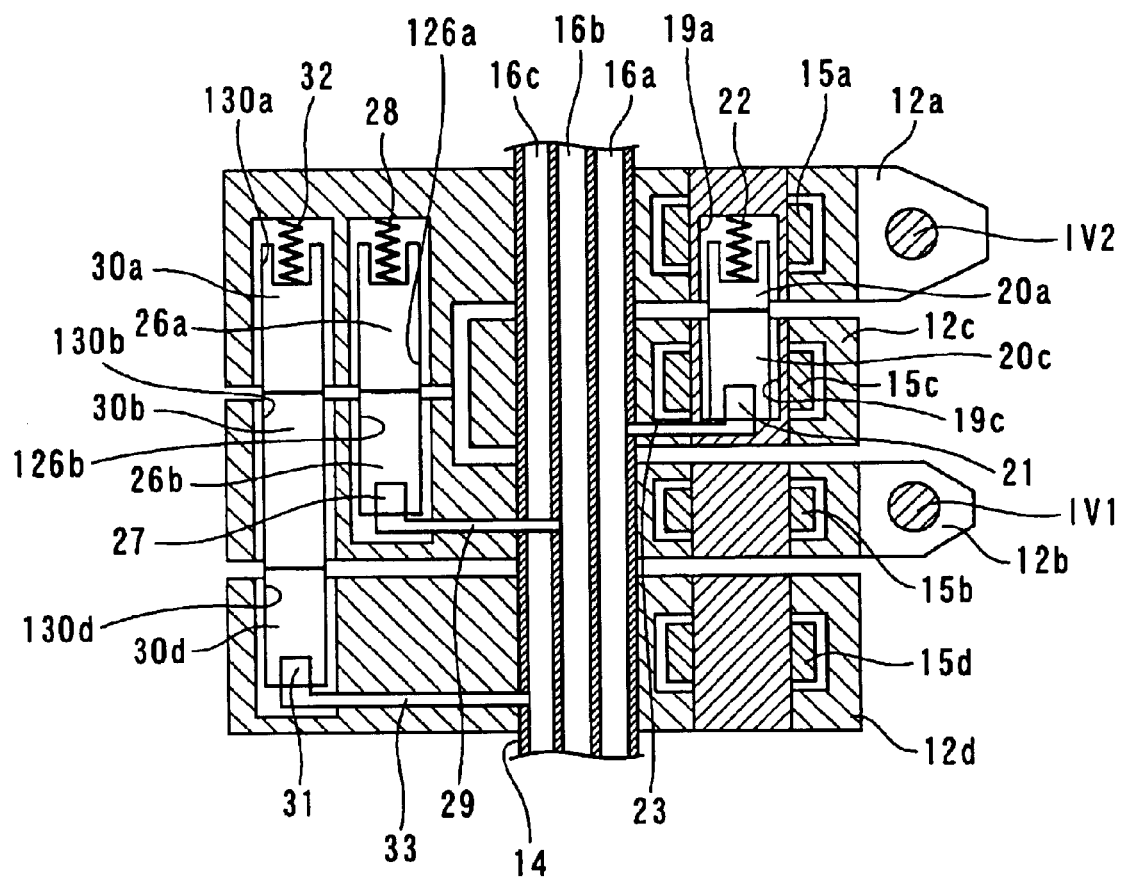
FIG. 5 is a cross-sectional view taken on line IV—IV of FIG. 3.

As shown in FIG. 5, the first switching valve 17a is formed by a piston valve, and has cylinders 19a, 19c formed in respective one end portions of the low-speed and delayed-closing rocker arms 12a, 12c, such that they are continuous with each other via a gap between the rocker arms 12a, 12c, with respective pistons 20a, 20c slidably disposed within the cylinders 19a, 19c, for axial abutment with each other. An oil chamber 21 is formed in the piston 20c on a side thereof toward the idling rocker arm 12b, and a coil spring 22 is disposed between the piston 20a and the cylinder 19a, for urging the piston 20a toward the delayed-closing rocker arm 12c.

The oil chamber 21 is communicated with the first oil pressure-switching mechanism 18a via an oil passage 23 formed through the delayed-closing rocker arm 12c, and the first oil passage 16a formed through the rocker shaft 14. The first oil pressure-switching mechanism 18a is comprised of an electromagnet valve and a spool (neither of which is shown), and connected to an oil pump (not shown). The mechanism 18a is driven by a control signal from the ECU 2, for switching between the supply and cut-off of the oil pressure to the first switching valve 17a via the first oil passage 16a, etc.

According to the above configuration, when the supply of the oil pressure from the first oil pressure-switching mechanism 18a to the first switching valve 17a is cut off, the pistons 20a, 20c of the first switching valve 17a are held in respective positions shown in FIG. 5 by the urging force of the coil spring 22, and engaged only with the cylinders 19a, 19c, respectively. Therefore, the low-speed and delayed-closing rocker arms 12a, 12c are disconnected from each other, and hence pivotally moved independently of each other. As a result, the idling rocker arm 12b is driven by the idling cam 11b, whereby the first intake valve IV1 is opened and closed in idling valve timing corresponding to the cam profile of the idling cam 11b (hereinafter referred to as "idling V/T"). On the other hand, the low-speed rocker arm 12a is driven by the low-speed cam 11a, whereby the second intake valve IV2 is opened and closed in low-speed valve timing corresponding to the cam profile of the low-speed cam 11a (hereinafter referred to as "low-speed V/T").

On the other hand, although not shown, when oil pressure is supplied from the first oil pressure-switching mechanism 18a to the oil chamber 21 of the first switching valve 17a, the pistons 20a, 20c of the first switching valve 17a slide toward the coil spring 22 against the urging force of the same, whereby the piston 20c comes into engagement with both the cylinder 19a and the cylinder 19b. This places the low-speed and delayed-closing rocker arms 12a, 12c in a connected state (not shown) for being pivotally moved in unison. As a result, with rotation of the camshaft 10, the low-speed and delayed-closing rocker arms 12a, 12c operate in a manner dependent on the above-described relationship between the low-speed cam 11a and the delayed-closing cam 11c, that is, they are driven by the low-speed cam 11a (=the delayed-closing cam 11c) until the maximum valve lift is reached, and then held by the delayed-closing cam 11c, whereby the second intake valve IV2 is opened and closed in delayed-closing valve timing corresponding to the cam profile of the delayed-closing cam 11c (hereinafter referred to as "delayed-closing V/T").

The second switching device 8 is basically similar in construction to the first switching device 7. The second switching device 8 is comprised of a second switching valve 17b for hydraulically switching between connection and disconnection of the low-speed and idling rocker arms 12a, 12b, and a second oil pressure-switching mechanism 18b for switching between supply and cut-off of oil pressure to the second switching valve 17b. The second switching valve 17b includes pistons 26a, 26b slidably disposed in respective cylinders 126a, 126b formed in the low-speed and idling rocker arms 12a, 12b, an oil chamber 27 formed in the piston 26b, and a coil spring 28 for urging the piston 26a toward the idling rocker arm 12b. The oil chamber 28 is communicated with the second oil pressure-switching mechanism 18b via an oil passage 29 formed through the idling rocker arm 12b, and the second oil passage 16b formed through the rocker shaft 14. The second oil pressure-switching mechanism 18b is controlled by the ECU 2, for switching between the supply and cut-off of the oil pressure to the second switching valve 17b.

According to the above configuration, when the supply of the oil pressure to the second switching valve 17b is cut off, the pistons 26a, 26b are urged by the urging force of the coil spring 28 into engagement only with the respective low-speed and idling rocker arms 12a, 12b, whereby the two rocker arms 12a, 12b are disconnected from each other, and hence are pivotally moved independently of each other. As a result, with rotation of the camshaft 10, the idling rocker arm 12b is driven by the idling cam 11b, whereby the first intake valve IV1 is opened and closed in the idling V/T corresponding to the cam profile of the idling cam 11b. On the other hand, the second intake valve IV2 is opened and closed by the low-speed cam 11a in the low-speed V/T.

On the other hand, although not shown, when oil pressure is supplied from the second oil pressure-switching mechanism 18b to the oil chamber 27 of the second switching valve 17b, the pistons 26a, 26b of the second switching valve 17b slide toward the coil spring 28 against the urging force of the same, whereby the piston 26b comes into engagement with both the low-speed and idling rocker arms 12a, 12b. This places the two rocker arms 12a, 12b in a connected state (not shown) for being pivotally moved in unison, whereby both the first and second intake valves IV1, IV2 are opened and closed by the low-speed cam 11a in the low-speed V/T.

The third switching device 9 is comprised of a third switching valve 17c for hydraulically switching between connection and disconnection of the low-speed, idling, and high-speed rocker arms 12a, 12b, and 12d, and a third oil pressure-switching mechanism 18c for switching between supply and cut-off of oil pressure to the third switching valve 17c. The third switching valve 17c includes pistons 30a, 30b, and 30d slidably disposed in respective cylinders 130a, 130b, and 130d formed in the low-speed, idling, and high-speed rocker arms 12a, 12b and 12d, an oil chamber 31 formed in the piston 30d, and a coil spring 32 for urging the piston 30a toward the idling rocker arm 12b. The oil chamber 31 is communicated with the third oil pressure-switching mechanism 18c via an oil passage 33 formed through the high-speed rocker arm 12d, and the third oil passage 16c formed through the rocker shaft 14. The third oil pressure-switching mechanism 18c is controlled by the ECU 2, for switching between the supply and cut-off of the oil pressure to the third switching valve 17c.

According to the above configuration, when the supply of oil pressure to the third switching valve 17c is cut off, the pistons 30a, 30b and 30d are urged by the urging force of the coil spring 32 into engagement only with the respective low-speed, idling, and high-speed rocker arms 12a, 12b, 12d, whereby the low-speed, idling, and high-speed rocker arms 12a, 12b, 12d are disconnected from each other, and hence pivotally moved independently of each other. As a result, with rotation of the camshaft 10, the first intake valve IV1 is opened and closed by the idling cam 11b in the idling V/T. On the other hand, the second intake valve IV2 is opened and closed by the low-speed cam 11a in the low-speed V/T.

On the other hand, although not shown, when oil pressure is supplied from the third oil pressure-switching mechanism 18c to the oil chamber 31 of the third switching valve 17c, the pistons 30a, 30b, and 30d of the third switching valve 17c slide toward the coil spring 32 against the urging force of the same, whereby the piston 30b comes into engagement with both the low-speed and idling rocker arms 12a, 12b, and at the same time the piston 30d comes into engagement with both the idling and high-speed rocker arms 12b, 12d. This places the low-speed and idling rocker arms 12a, 12b in a state (not shown) connected with the high-speed rocker arm 12d for being pivotally moved in unison. As a result, with rotation of the camshaft 10, the low-speed and idling rocker arms 12a, 12b are both driven by the high-speed cam 11d having the largest cam profile via the high-speed rocker arm 12d, whereby both the first and second intake valves IV1, IV2 are opened and closed in high-speed valve timing corresponding to the cam profile of the high-speed cam 11d (hereinafter referred to as "high-speed V/T").

As described above, the first to third switching devices 7 to 9 are each switched between connection of respective associated ones of the rocker arms 12a to 12d and disconnection of the associated rocker arms. Further, the first to third switching devices 7 to 9 are controlled independently of each other by the ECU 2, so that it is possible not only to drive one of them, but also to drive two or all of them simultaneously. This makes it possible to selectively use the intake cams 11a to 11d, for opening and closing the first intake valve IV1 and the second intake valve IV2.

On the other hand, the cam-type valve actuating mechanism 6 for actuating the first and second exhaust valves EV1, EV2 is comprised of an exhaust camshaft 24, exhaust cams 25a, 25b provided on the exhaust camshaft 24, exhaust rocker arms (not shown), and so forth, as shown in FIG. 1. The exhaust valves EV1, EV2 are opened and closed by valve lifts and in opening and closing timing corresponding to the cam profiles of the exhaust cams 25a, 25b. It should be noted that the cam-type valve actuating mechanism 6 may be also configured to be provided with a cam profile-switching mechanism for switching the first and second exhaust valves EV1, EV2 between low-speed valve timing and high-speed valve timing.

A crankshaft angle sensor 42 (operating condition-detecting means) is disposed around the crankshaft. With rotation of the crankshaft, the crankshaft angle sensor 42 generates a CYL signal, a TDC signal, and a CRK signal, as pulse signals, at respective predetermined crank angle positions to deliver the signals to the ECU 2. The CYL signal is generated at a predetermined crank angle position of a particular cylinder 4. The TDC signal indicates that the piston (not shown) of each cylinder 4 is at a predetermined crank angle position in the vicinity of the TDC (top dead center) position at the start of the intake stroke of the piston, and in the case of the four-cylinder engine of the present embodiment, one pulse of the TDC signal is delivered whenever the crankshaft rotates through 180 degrees. Further, the CRK signal is generated at a shorter cycle than that of the TDC signal i.e. whenever the crankshaft rotates through e.g. 30 degrees. The ECU 2 determines the respective crank angle positions of the cylinders 4 on a cylinder-by-cylinder basis, based on these CYL, TDC, and CRK signals, and calculates the rotational speed Ne of the engine 3, (hereinafter referred to as "the engine speed") based on the CRK signal. Further, input to the ECU 2 are a signal indicative of an accelerator opening ACC which is a stepped-on amount of an accelerator pedal (not shown) from an accelerator opening sensor 43 (load parameter-detecting means).

Figure 6:
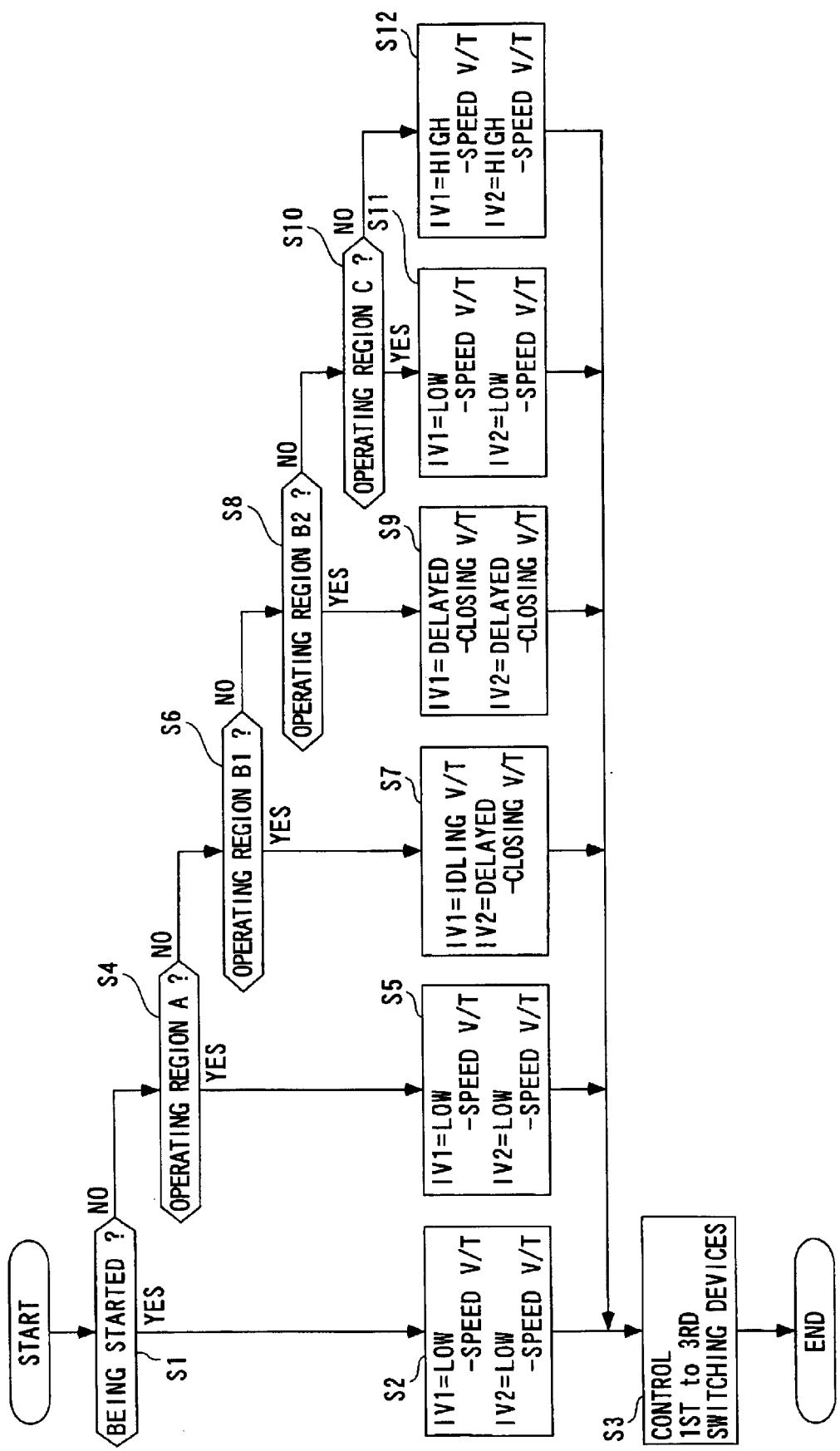
FIG. 6 is a flowchart showing, by way of example, a valve actuation control process executed by an ECU.

The ECU 2 in the present embodiment forms switching mechanism control means, and is implemented by a microcomputer comprised of a CPU, a RAM, a ROM, and an input/output interface (none of which is shown). The above-mentioned signals indicative of detections by the sensors 42, 43 are input to the CPU after A/D conversion and shaping by the input/output interface. The CPU executes control programs stored in the ROM to thereby determine operating conditions of the vehicle based on these input signals, and control the operations of the cam profile-switching mechanism 13 in the following manner:

FIG. 6 shows a valve actuation control process, which is executed whenever the TDC signal pulse is generated. In this process, first in a step S1, it is determined whether or not the engine 3 is being started. This determination is carried out e.g. based on the engine speed Ne, and when the engine speed Ne is equal to or lower than a predetermined rotational speed (e.g. 500 rpm), it is determined that the engine 3 is being started. If the answer to the question is affirmative (YES), i.e. if the engine 3 is being started, the first and second intake valves IV1, IV2 are set to the low-speed V/T (step S2). Then, the first to third switching devices 7 to 9 are controlled based on the valve timing set in the step S2. More specifically, the second switching device 8 is driven for connection, and the first and third switching devices 7, 9 are driven for disconnection (step S3), followed by terminating the present process.

Figures 7, 8:
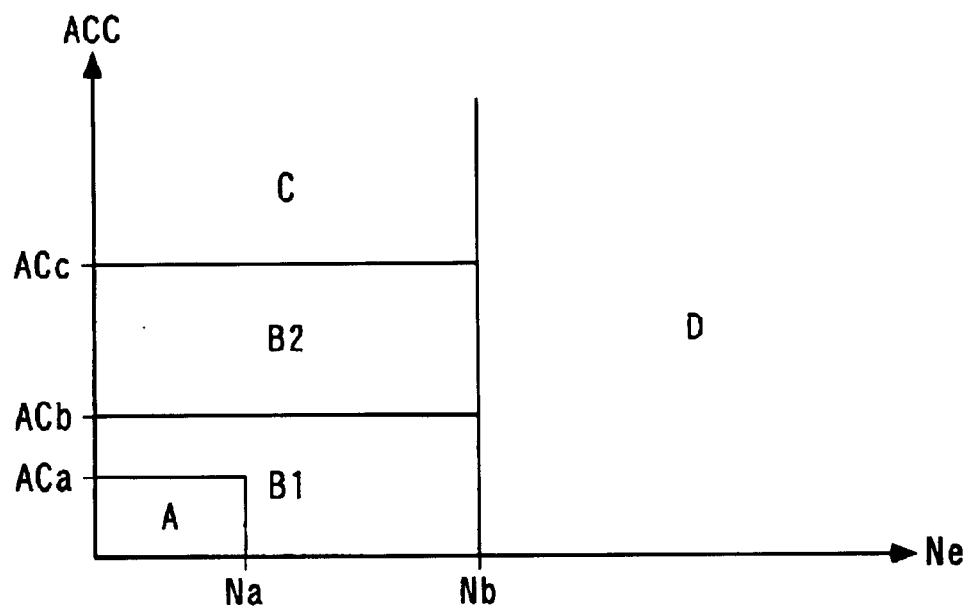
FIG. 7 is a view showing, by way of example, an operating region map for use in the FIG. 6 valve actuation control process.
FIG. 8 is a view showing, by way of example, a table showing settings of valve-closing timing for first and second intake valves.

On the other hand, if the answer to the question of the step S1 is negative (NO), i.e. if the engine 3 is not being started, it is determined whether or not the vehicle is in an operating region A (step S4). FIG. 7 shows an example of a map defining operating regions of the engine. The operating region A defines an idle operating region in which the engine speed Ne is lower than a predetermined value Na (e.g. 750 rpm) and the accelerator opening ACC is lower than a predetermined value ACa (e.g. 15%). An operating region B1 defines a low-rotational speed/low-load region (hereinafter referred to as "the low-load mode region) within a low-load operating region of the engine, exclusive of the operating region A, in which the Ne value is lower than a predetermined value Nb (e.g. 2500 rpm) as a first predetermined value and the ACC value is lower than a predetermined value ACb (e.g. 40%) as a second predetermined value, and an operating region B2 defines a low-rotational speed/medium-load region (hereinafter referred to as "the medium-load mode region) within the low-load operating region of the engine, in which the Ne value is lower than the predetermined value Nb as the first predetermined value and the ACC value is lower than a predetermined value ACc (e.g. 70%) as a first predetermined value. It should be noted that each of the operating regions B1, B2 is a region (cruising mode region) corresponding to cruising of the vehicle, i.e. a low-load operating region. Further, an operating region C defines a low-rotational speed/high-load region in which the Ne value is lower than the predetermined value Nb and the ACC value is higher than the predetermined value ACc, and an operating region D defines a high-rotational speed region in which the Ne value is higher than the predetermined value Nb.

FIG. 8 shows examples of valve timings set for the first and second intake valves IV1, IV2 according to the map thus defining the engine operating regions and stored in the ROM of the ECU 2.

Referring again to FIG. 6, if the answer to the question of the step S2 is affirmative (YES), i.e. if the engine 3 is in the operating region A (idle operating region), the first and second intake valves IV1, IV2 are set to the low-speed V/T based on the FIG. 8 map (step S4). Then, similarly to the step S3, the second switching device 8 is driven for connection, and the first and third switching devices 7, 9 are driven for disconnection (step S5), followed by terminating the present process. More specifically, when the engine 3 is in the idle operating region, valve opening/closing operation in the delayed-closing V/T by the delayed-closing cam 12c is not carried out, which makes it possible to suppress degradation of combustion, thereby ensuring stable combustion.

If the answer to the question of the step S4 is negative (NO), it is determined whether or not the engine 3 is in the operating region B1 (low-load mode region) (step S6). If the answer to the question is affirmative (YES), the first and second intake valves IV1, IV2 are set to the idling V/T and the low-speed V/T, respectively, based on the FIG. 8 map (step S7). Then, the process proceeds to the step S3, and the first switching device 7 is driven for connection, and the second and third switching devices 8, 9 are driven for disconnection, followed by terminating the present process. As described above, when the engine 3 is in the operating region B1, i.e. when the vehicle is cruising and at the same time the engine is the low-rotational speed/low-load region, it is possible to suppress degradation of combustion and ensure stable combustion by causing most of a mixture to flow into the combustion chamber via the second intake valve IV2 to thereby produce a swirl in the combustion chamber.

If the answer to the question of the step S6 is negative (NO), it is determined whether or not the engine 3 is in the operating region B2 (medium-load mode region) (step S8). If the answer to the question is affirmative (YES), the first and second intake valves IV1, IV2 are both set to the delayed-closing V/T (step S9). Then, the process proceeds to the step S3, and based on the valve timing set in the step S9, the first and second switching devices 7, 8 are driven for connection, and the third switching device 9 is driven for disconnection, followed by terminating the present process. As described above, when the engine 3 is in the operating region B2, i.e. when the vehicle is cruising, and at the same time the engine is in the low-rotational speed/medium-load region, it is possible to reduce pumping loss and improve fuel economy by delaying the valve-closing timing of the first and second intake valves IV1, IV2.

If the answer to the question of the step S8 is negative (NO), it is determined whether or not the engine 3 is in the operating region C (low-rotational speed/high-load region) (step S10). If the answer to the question is affirmative (YES), the first and second intake valves IV1, IV2 are both set to the low-speed V/T (step S11). Then, the process proceeds to the step S3, and based on the valve timing set in the step S11, the second switching device 8 is driven for connection, and the first and third switching devices 7, 9 are driven for disconnection, followed by terminating the present process. As described above, when the engine 3 is in the operating region C, i.e. in the low-rotational speed/high-load region, it is possible to positively obtain high power output of the engine 3 by causing the first and second intake valves IV1, IV2 in the low-speed V/T.

If the answer to the question of the step S10 is negative (NO), i.e. if the engine 3 is in the operating region D (high-rotational speed region), the first and second intake valves IV1, IV2 are both set to the high-speed V/T (step S12). Then, based on the valve timing set in the step S12, the third switching device 9 is driven for connection, and the first and second switching devices 7, 8 are driven for disconnection, followed by terminating the present process. As described above, when the engine 3 is in the operating region D, i.e. in the high-rotational speed region, it is possible to obtain larger power output of the engine 3 by increasing the amount of intake air through increased valve lifts by opening and closing the first and second intake valves IV1, IV2 in the high-speed V/T.

As described above, according to the valve actuating apparatus of the present embodiment, it is possible not only to drive the first and second intake valves IV1, IV2 by the cam-type valve actuating mechanism 5, but also to select between the intake cams 11 for opening and closing the first and second intake valves IV1, IV2, using the first to third switching devices 7 to 9, to thereby obtain optimal fuel economy and power output of the engine 3 on an operating region-by-operating region basis.

More specifically, as described hereinabove, when the engine 3 is being started or idling, the first and second intake valves IV1, IV2 are both opened and closed by the low-speed cam 11a. This prevents degradation of combustion which would be caused by the use of the delayed-closing cam 11c, whereby stable combustion can be positively obtained. When the engine 3 is in the low-load mode region during cruising of the vehicle, the first intake valve IV1 is operated by the idling cam 11b, and the second intake valve IV2 is operated by the delayed-closing cam 11c. This causes a swirl to be produced in the combustion chamber 3b to suppress degradation of combustion, whereby stable combustion can be positively obtained. When the engine 3 is in the medium-load mode region during cruising of the vehicle, the first and second intake valves IV1, IV2 are both operated by the delayed-closing cam 11c. This causes valve-closing timing to be delayed, whereby pumping loss can be reduced, which contributes to improved fuel economy. Thus, the intake cam is switched between the delayed-closing cam 11c and the low-speed cam 11a according to an operating condition of the engine 3, whereby stable combustion and improved fuel economy can both be achieved in the low-load and medium-load operating regions of the engine at the same time.

Further, when the engine 3 is in the high-rotational speed region, the first and second intake valves IV1, IV2 are operated in the high-speed V/T. This increases the amount of intake air, whereby larger power output of the engine 3 can be obtained.

Moreover, according to the present embodiment, since the rocker arms 12 are comprised of the high-speed, idling, delayed-closing, and low-speed rocker arms 12d, 12b, 12c, 12a arranged in the mentioned order, and the idling rocker arm 12b is smaller in width than the low-speed rocker arm 12a, the distance, as viewed along the axis of the camshaft 10, between the center of the combustion chamber 3b and the end of the high-speed rocker arm 12d can be made shorter than in the case where the high-speed rocker arm 12d is disposed at a location axially outward of the low-speed rocker arm 12a, which makes it possible to arrange the whole rocker arms 12 in a manner well-balanced with respect to the combustion chamber 3b.

Figure 9A:
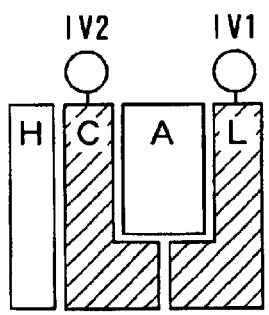
FIGS. 9A to 9E are schematic views showing essential components of a variation of the first embodiment.
Figure 9B:
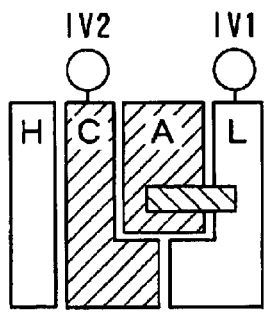
Figure 9C:
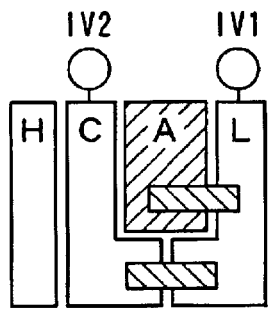
Figure 9D:
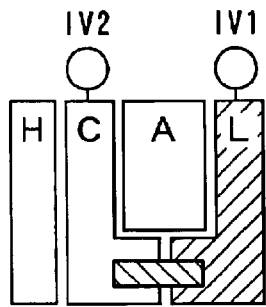
Figure 9E:
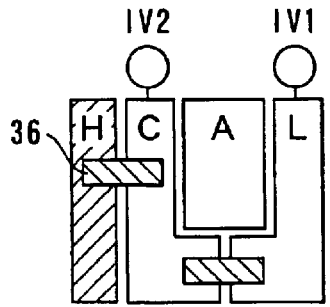

FIGS. 9A to 9E are schematic view showing essential components of a variation of the above described first embodiment. This variation is identical to the first embodiment in the arrangement of the intake cams 11, the rocker arms 12, and other components, but distinguished therefrom only in the arrangement of the third switching device 9. More specifically, in the first embodiment, the third switching device 9 is used for switching between connection and disconnection of the low-speed, idling, and high-speed rocker arms 12a, 12b, 12d, whereas in this variation, a switching device 36 replaces the third switching device 9, for switching between connection and disconnection of the idling and high-speed rocker arms 12*a*, 12*d*. In the operating region D, as shown in FIG. 9E, the switching device 36 and the second switching device 8 are simultaneously driven for connection, whereby the low-speed, idling, and high-speed rocker arms 12*a*, 12*b*, 12*d* are connected to each other, causing the first and second intake valves IV1, IV2 to be both opened and closed in the high-speed V/T. In the other operating regions, the first and second switching devices 7, 8 are controlled in the same manner as in the first embodiment, whereby the first and second intake valves IV1, IV2 are opened and closed in the same valve timing as in the first embodiment. Therefore, it is possible to obtain the same advantageous effects as provided by the first embodiment.

Figure 10C:
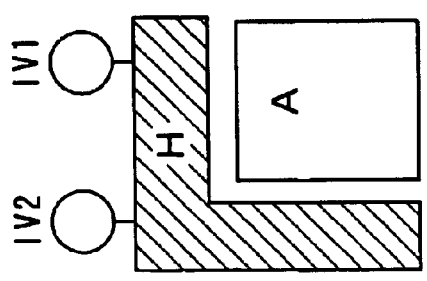
FIGS. 10A to 10C are schematic views showing essential components of a valve actuating apparatus according to a second embodiment of the invention.
Figure 10B:
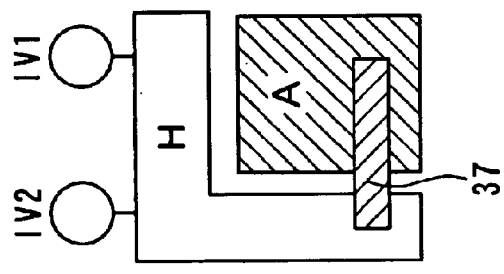
Figure 10A:
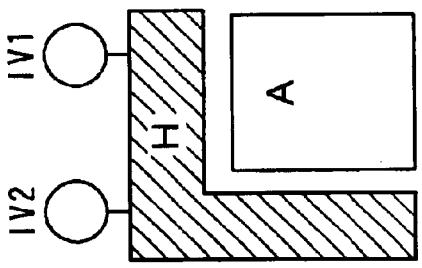

FIGS. 10A to 10C are schematic views showing essential components of a valve actuating apparatus according to a second embodiment of the present invention. In the second embodiment, intake cams 11 are comprised of a delayed-closing cam 11*c* and a high-speed cam 11*d*, and rocker arms 12 are comprised of delayed-closing and high-speed rocker arms 12*c*, 12*d* associated with the cams 11*c*, 11*d*, respectively. The high-speed rocker arm 12*d* is formed to have an L shape with a portion extended along the axis of the camshaft 10, for being in contact with both the first intake valve IV1 and the second intake valve IV2.

In the present embodiment, according to this configuration, a switching device 37 is driven for disconnection in the operating region A, whereby the first and second intake valves IV1, IV2 are opened and closed in the high-speed V/T (FIG. 10A). This makes it possible to prevent degradation of combustion and positively obtain stable combustion. In the operating regions B1, B2, the switching device 37 is driven for connection, whereby the delayed-closing and high-speed rocker arms 12*c*, 12*d* are connected to each other, causing the first and second intake valves IV1, IV2 to be opened and closed in the delayed-closing V/T (FIG. 10B). This makes it possible to improve fuel economy by reducing pumping loss. In the operating regions C, D, the switching device 37 is driven for disconnection, whereby the first and second intake valves IV1, IV2 are both opened and closed in the high-speed V/T (FIG. 10C) as is the case with the operating region A. This makes it possible to positively obtain high power output of the engine 3.

Figure 11A:
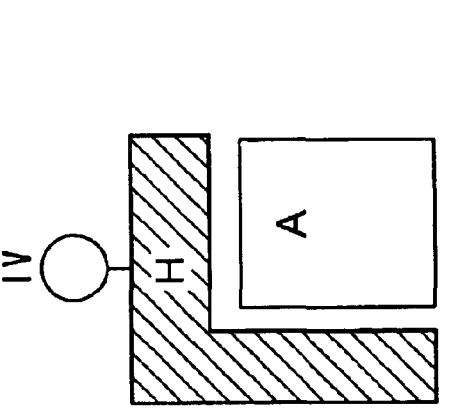
FIGS. 11A to 11C are schematic views showing essential components of a valve actuating apparatus according to a third embodiment of the invention.
Figure 11B:
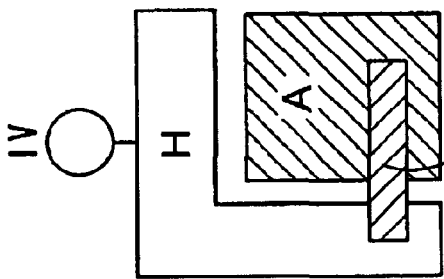
Figure 11C:
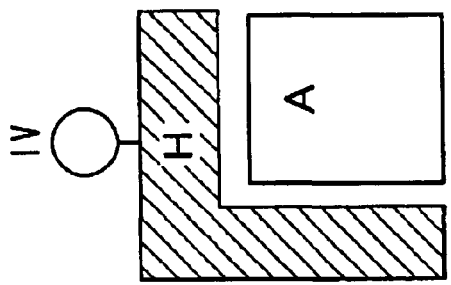

FIGS. 11A to 11C are schematic views showing essential components of a valve actuating apparatus according to a third embodiment of the present invention. The third embodiment is distinguished from the second embodiment only in that a single intake valve IV is opened and closed by intake cams 11. Operation of the switching device 37 in each of the operating regions A to D is similar to that in the second embodiment, and hence it is possible to obtain the same advantageous effects as provided by the second embodiment.

FIGS. 12A to 12B are schematic views showing essential components of a valve actuating apparatus according to a fourth embodiment of the present invention. In the fourth embodiment, intake cams 11 are comprised of idling, delayed-closing, and high-speed cams 11*b* to 11*d*, and rocker arms 12 are comprised of idling, delayed-closing, and high-speed rocker arms 12*b* to 12*d* associated with the cams 11*b* to 11*d*, respectively. Further, there are provided a switching device 38 for switching between connection and disconnection of the delayed-closing rocker arm 12*c* and the high-speed rocker arm 12*d*, a switching device 39 for switching between connection and disconnection of the idling, delayed-closing, and high-speed rocker arms 12*b* to 12*d*, and a switching device 40 for switching between connection and disconnection of the idling rocker arm 12*b* and the high-speed rocker arm 12*d*. The first and second intake valves IV1 and IV2 are in contact with the high-speed and idling rocker arms 12*d*, 12*b*, respectively.

With this arrangement of the present embodiment, in the operating region A, the switching device 38 is driven for connection, and the switching devices 39, 40 are each driven for disconnection, whereby the first intake valve IV1 is opened and closed in the high-speed V/T, and the second intake valve IV2 is opened and closed in the idling V/T (FIG. 12A). This makes it possible to prevent degradation of combustion and positively obtain stable combustion. In the operating regions B1, B2, the switching device 39 is driven for connection, and the switching devices 38, 40 are driven for disconnection, whereby the first and second intake valves IV1, IV2 are opened and closed in the delayed-closing V/T (FIG. 12B). This makes it possible to improve fuel economy by reducing pumping loss. In the operating regions C, D, the switching device 40 is driven for connection, and the switching devices 38, 39 are driven for disconnection, whereby the two intake valves IV1, IV2 are opened and closed in the high-speed V/T (FIG. 12C). This makes it possible to obtain larger power output of the engine 3.

FIGS. 13A to 13C are schematic views showing essential components of a valve actuating apparatus according to a fifth embodiment of the present invention. The present embodiment is distinguished from the above described fourth embodiment in that a low-speed cam 11*a* is used in place of the idling cam 11*b*, and the other components and operations of the switching devices 38 to 40 in the operating regions A to D are similar to those described as to the fourth embodiment. Therefore, the two intake valves IV1, IV2 are opened and closed in the same valve timing as in the fourth embodiment, except that the second intake valve IV2 is opened and closed in the low-speed V/T in the operating region A, and hence it is possible to obtain the same advantageous effects as provided by the fourth embodiment.

FIG. 14 is a view of a table collectively showing combinations of intake cams 11 used in the described above embodiments. The combinations of intake cams 11 are not necessarily limited to those described above as to the embodiments and enumerated in the table, but any suitable combination can be set. For example, there may be provided more than two intake valves, and operating regions of the engine 3 may be set differently from those in the above embodiments, with various suitable combinations of intake cams 11 being set depending on the number of the intake valves and/or the settings of the operating regions. Further, the number and positions of switching devices for changing the intake cams 11 for opening and closing intake valves can also be set variously depending on the set combination of intake cams 11. Furthermore, although in the above embodiments, only the cam profile-switching mechanism 13 for switching between respective cam profiles of intake cams 11 is used to set valve-closing timing of intake valves, a mechanism for continuously varying the phases of the intake cams 11 may be used in addition to the cam profile-switching mechanism 13, to thereby set the valve-closing timing of intake valves more finely.

Although in the above embodiments, the crankshaft angle sensor 42 and the accelerator opening sensor 43 are used as operating condition-detecting means for detecting operating condition of the engine 3, this is not limitative, but load parameter-detecting means included in the operating condition-detecting means may be implemented by any other suitable sensor, such as an intake pipe absolute pressure sensor, which is capable of detecting a load parameter.

Further, although in the above embodiments, the valve actuating apparatus according to the invention is applied to an internal combustion engine installed on an automotive vehicle, this is not limitative, but the invention is applicable to internal combustion engines for other industrial machines, such as those installed on ships and those for power generation use.

It is further understood by those skilled in the art that the foregoing are preferred embodiments of the invention, and that various changes and modifications may be made without departing from the spirit and scope thereof.

What is claimed is:

1. A valve actuating apparatus for an internal combustion engine, which actuates an intake valve of the engine for opening and closing thereof, the intake valve comprising at least a first intake valve and a second intake valve, the valve actuating apparatus comprising:

a camshaft that is driven for rotation in synchronism with rotation of the engine;

a delayed-closing cam provided on said camshaft, for operation of the engine in a Miller cycle;

a normal cam provided on said camshaft and having a cam profile for earlier valve-closing timing of the intake valve than a cam profile of said delayed-closing cam;

an idling cam provided on said camshaft and having a cam profile for making the first intake valve substantially idle;

a switching mechanism that switches the intake cam for opening and closing the intake valve, between said delayed-closing cam and said normal cam;

operating condition-detecting means for detecting an operating condition of the engine, wherein said operation condition-detecting means includes load parameter-detecting means for detecting a load parameter indicative of a load on the engine; and switching mechanism control means for controlling said switching mechanism such that when the detected operating condition of the engine indicates starting or idling of the engine, the intake valve is opened and closed by said normal cam, and when the detected operating condition of the engine is a predetermined operating condition indicating other than the starting and idling of the engine, the intake valve is opened and closed by said delayed-closing cam, wherein the predetermined operating condition of the engine includes a condition of the load parameter detected by said load parameter-detecting means being smaller than a first predetermined value, and wherein said switching mechanism control means controls said switching mechanism such that when the load parameter is smaller than a second predetermined value which is smaller than the first predetermined value, the first intake value is made substantially idle by said idling cam, and the second intake valve is opened and closed by said delayed-closing cam, and when the load parameter is equal to or larger than the second predetermined value and smaller than the first predetermined value, the first intake valve and the second intake valve are opened and closed by said delayed-closing cam.

2. A valve actuating apparatus as claimed in claim 1, wherein said normal cam comprises:

a low-speed cam having a cam profile that gives a valve lift of the intake valve, which is equal to or smaller than a valve lift given by the cam profile of said delayed-closing cam, and a high-speed cain having a cam profile that gives a valve lift of the intake valve, which is larger than the valve lifts given by the respective cam profiles of said delayed-closing cam and said low-speed cam, the valve actuating apparatus further comprising:

a first rocker arm in contact with said idling cam and the first intake valve, a second rocker arm in contact with said delayed-closing cam, a third rocker arm in contact with said low-speed cam and the second intake valve, and a fourth rocker arm in contact with said high-speed cam, and said switching mechanism having:

a first switching device for switching between connection and disconnection of said second rocker arm and said third rocker arm, a second switching device for switching between connection and disconnection of said first rocker arm and said third rocker arm, and a third switching device for switching between connection and disconnection of said first rocker arm, said third rocker arm, and said fourth rocker arm, and wherein said first rocker arm is smaller in width along a direction of an axis of said crankshaft than said third rocker arm, and said second rocker arm is disposed between said first rocker arm and said third rocker arm, said fourth rocker arm being disposed on a side of said first rocker arm remote from said second rocker arm.

3. A valve actuating apparatus for an internal combustion engine, which actuates an intake valve or the engine for opening and closing thereof, the intake valve comprising at least a first intake valve and a second intake valve, the valve actuating apparatus comprising:

a camshaft that is driven for rotation in synchronism with rotation of the engine;

a delayed-closing cam provided on said camshaft, for operation of the engine in a Miller cycle;

a normal cam provided on said camshaft and having a cam profile for earlier valve-closing timing of the intake valve than a cam profile of said delayed-closing cam;

an idling cam provided on said camshaft and having a cam profile for making the first intake valve substantially idle;

a switching mechanism that switches the intake cam for opening and closing the intake valve, between said delayed-closing cam and said normal cam;

operating condition-detecting means for detecting an operating condition of the engine, wherein said operating condition-detecting means comprises load parameter-detecting means for detecting a load parameter indicative of a load on the engine; and switching mechanism control means for controlling said switching mechanism such that when the detected operating condition of the engine indicates starting or idling of the engine, the intake valve is opened and closed by said normal cam, and when the detected operating condition of the engine is a predetermined operating condition indicating other than the starting and idling of the engine, the intake valve is opened and closed by said delayed-closing cam, wherein the engine is installed on a vehicle, and wherein the predetermined operating condition of the engine corresponds to cruising of the vehicle, and wherein said switching mechanism control means controls said switching mechanism such that under the predetermined operating condition of the engine corresponding to the cruising of the engine, when the load parameter detected by said load parameter-detecting means is smaller than a predetermined value, the first intake valve is made substantially idle by said idling cam, and the second intake valve is opened and closed by said delayed-closing cam, and when the load parameter is equal to or larger than predetermined value, the first intake valve and the second intake valve are opened and closed by said delayed-closing cam.

4. A valve actuating apparatus as claimed in claim 3, wherein said normal cam comprises:

a low-speed cam having a cam profile that gives a valve lift of the intake valve, which is equal to or smaller than a valve lift given by the cam profile of said delayed-closing cam, and a high-speed cam having a cam profile that gives a valve lift of the intake valve, which is larger than the valve lifts given by the respective cam profiles of said delayed-closing cam and said low-speed cam, the valve actuating apparatus further comprising:

a first rocker arm in contact with said idling cam and the first intake valve, a second rocker arm in contact with said delayed-closing cam, a third rocker arm in contact with said low-speed cam and the second intake valve, and a fourth rocker arm in contact with said high-speed cam, and said switching mechanism having:

a first switching device for switching between connection and disconnection of said second rocker arm and said third rocker arm, a second switching device for switching between connection and disconnection of said first rocker arm and said third rocker arm, and a third switching device for switching between connection and disconnection of said first rocker arm, said third rocker arm, and said fourth rocker arm, and wherein said first rocker arm is smaller in width along a direction of an axis of said crankshaft than said third rocker arm, and said second rocker arm is disposed between said first rocker arm and said third rocker arm, said fourth rocker arm being disposed on a side of said first rocker arm remote from said second rocker arm.

* * * * *